United States Patent [19]

Dattilo

[11] Patent Number: 5,293,258
[45] Date of Patent: Mar. 8, 1994

[54] AUTOMATIC CORRECTION FOR COLOR PRINTING

[75] Inventor: Anthony J. Dattilo, Longmont, Colo.

[73] Assignee: International Business Machines Corporation, Armonk, N.Y.

[21] Appl. No.: 966,677

[22] Filed: Oct. 26, 1992

Related U.S. Application Data

[63] Continuation of Ser. No. 636,513, Dec. 31, 1990, abandoned.

[51] Int. Cl.[5] .............................................. H04N 1/46
[52] U.S. Cl. ..................... 358/518; 358/500; 395/131
[58] Field of Search ................ 358/482, 483, 75, 80, 358/406; 382/17; 395/131; H04N 1/46

[56] References Cited

U.S. PATENT DOCUMENTS

| | | | |
|---|---|---|---|
| 3,612,753 | 10/1971 | Korman | 358/80 |
| 4,349,853 | 9/1982 | Horiguchi et al. | 358/80 |
| 4,500,919 | 2/1985 | Schreier | 358/78 |
| 4,590,515 | 5/1986 | Wellendorf | 358/75 |
| 4,661,843 | 4/1987 | Sekizawa et al. | 358/80 |
| 4,841,360 | 6/1989 | Birgmeir | 358/80 |
| 4,845,550 | 7/1989 | Urabe et al. | 358/80 |
| 4,853,768 | 8/1989 | Suzuki et al. | 358/80 |

OTHER PUBLICATIONS

IBM Technicl Disclosure Bulletin, vol. 28, No. 1, Jun. 1985, "Digital Color Halftone Reproduction", by P. Stucki, pp. 438–439.

*Primary Examiner*—Edward L. Coles, Sr.
*Assistant Examiner*—Jill Jackson
*Attorney, Agent, or Firm*—Carl M. Wright

[57] ABSTRACT

Automatic processing of color signals to print an accurate reproduction of an original color image. The RGB scan signals are processed to use the full dynamic range of the system and to adjust the values such that the gray scale lines of the color components pass through the white points. The additive color signals are converted to subtractive color signals that are adjusted so that the gray scale lines pass through the black points to produce automatically an accurate reproduction with a proper neutral gray scale. The processing is arranged to make the adjustments and corrections as fast as possible.

6 Claims, 2 Drawing Sheets

AUTOMATIC CORRECTION FOR COLOR PRINTING

This is a continuation of copending application Ser. No. 07/636,513 filed Dec. 31, 1990, and now abandoned.

BACKGROUND AND SUMMARY OF THE INVENTION

This invention relates to corrections to color separations for color printing and particularly to modifying signals representative of various colors in a picture, specifically one in which the colors do not vary with time, to reproduce a color picture that is a true representation of the original picture.

Reproducing color images by printing with inks requires adjustments to the signals that control the inks. Most systems printing color images use a three color, or tristimulus, basis. The signals originate from scanning a color image to be reproduced and separating the tristimulus color components. In cases where the original image is a color photograph, it is desirable that the reproduction be an accurate reproduction of the original. The hue versus saturation plots of color inks and color photographs are not the same and both are different from the response of the human eye. In addition, nonlinear errors are introduced by the scanning system.

Further complications are introduced because the scanning system responds to additive color mixtures whereas the perception of color images printed on a medium responds to subtractive color mixtures. The relations among the signals can be represented by equations attributed Neugebauer, but reproducing color images accurately have required the intervention of an operator to make the final adjustments. This has been done by making printing plates and test impressions from which adjustments are made. Modern systems use color television monitors which makes the adjustments more convenient, faster, and cheaper. Still, the systems use operator intervention exercising subjective, albeit it experienced, judgements.

The prior art systems for color correction in color reproduction require the intervention of an operator to adjust the signals controlling the inks based on subjective judgments of the results. Usually test reproductions are required on which the operator bases the judgment of changes required.

U.S. Pat. No. 4,500,919 describes a system for reproducing a color original by extracting three color components which are corrected by an operator manipulating a television image to introduce aesthetic corrections. This requires no knowledge of the ink and media characteristics.

U.S. Pat. No. 4,590,515 reduces CMY inks and increases black to compensate for the reduction. This prevents color casts occurring in the reproduction of gray tones. The adjustments for color fidelity are not automatic.

U.S. Pat. No. 4,841,360 electronically enhances images and then adjusted to the characteristics of the copy material. The image is then modified proportional to the illumination intensity of the displaying CRT followed by correction to adjust gray balance (contrast). The image printed via the CRT with adjustments to the nonlinear characteristics function (line) of the CRT by a suitable amplifier so that the CRT does not distort the gray balance. There is no teaching of automatically correcting for nonlinearities in color printing.

U.S. Pat. No. 4,845,550 adjusts the coefficients of a polynomial representing color correction using six hue signals. The procedure equalizes the weights of the three color signals processed so that the six hue signals produced therefrom divide a color space. Nothing is shown for automatically correcting three color printing.

The invention is useful in color printing because it is automatic, therefore faster and less susceptible to subjective judgements. It also precludes the necessity of printing proof sheets. Furthermore, it corrects the input color separation space so that the input values from different scanning systems can be printed together. The corrections to the printing color space are straightforwardly computational which allows the conversions to be made efficiently on systems not readily adaptive to other methods of color conversion such as table lookups in interpretive systems.

In accordance with the invention, a method of processing color component signals for accurately reproducing color images includes scanning the color image to be reproduced to derive color components of the image. These components may be the tristimulus values of red, green, and blue, viz., the RGB components. Errors introduced by the scanning process are corrected, preferably using look up tables based on reference signals derived from the signals resulting from scanning test targets on the media upon which the reproduction is to be made.

Irregularities in the reproduced image introduced by the characteristics of the ink used for reproduction are corrected by deriving parameters of the individual inks used and applying nonlinear modifications to the signals without the need for operator intervention.

BRIEF DESCRIPTION OF THE DRAWING

The invention is described in detail by referring to the various figures which illustrate specific embodiments of the invention, and wherein like numerals refer to like elements.

DESCRIPTION OF THE PREFERRED EMBODIMENT

In the following description, references are made to the flowcharts depicting the sequence of operations performed by the program. The symbols used therein are standard flowchart symbols accepted by the American National Standards Institute and the International Standards Organization. In the explanation, an operation may be described as being performed by a particular block in the flowchart. This is to be interpreted as meaning that the operations referred to are performed by programming and executing a sequence of instructions that produces the result said to be performed by the described block. The actual instructions used depend on the particular hardware used to implement the invention. Different processors have different instruction sets but the person of ordinary skill in the art is familiar with at least one instruction set and can implement the operations set forth in the blocks of the flowchart.

Certain operations are common to all programs. One is referred to as housekeeping which includes operations like establishing constants, reserving memory space for variables, and supplying names to subroutines. Another is calling subroutines which includes call and link procedures, i.e., establishing the address of the subroutine and supplying the parameters from the calling routine to the subroutine. These operations are sometimes accomplished using stacks, a section of memory which operates as a last-in-first-out (LIFO) buffer. When an address, operand, instruction, or the like is stored in the stack, the operation is called push. For example, when an operand is to be passed to a subroutine, it is pushed onto the stack., i.e., stored in the buffer. When the subroutine needs the parameter, it is read from the top of the stack by an operation called pop. Since these operations are well known in the art, no special explanations will be made except as necessary for a clear understanding of the invention.

The method of the invention is described herein as if it were a computer subroutine. This precludes the necessity to include all the housekeeping and other operations that are not necessary for an understanding of the invention and the implementation of which is well known to those skilled in the art.

Figure 1:
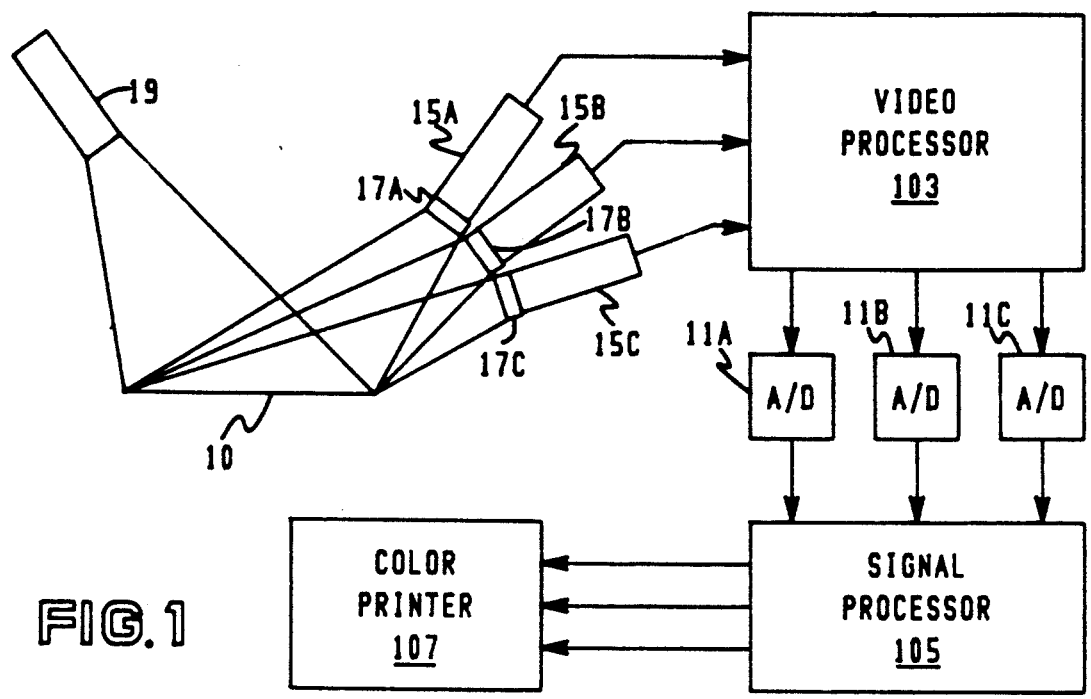
FIG. 1 is an example of a system in which the invention can be utilized.

A typical system in which the invention is useful is similar to that shown in FIG. 1. An original color image which is to be reproduced on a color printer is scanned and the intensity or value of the color components of each pel is derived.

Pels, sometimes called pixels, are picture elements, usually dots, that make up a page of text or images or combinations thereof. In black and white printing, a pel having a value of 0 usually represents a white dot, i.e., absence of ink, and a pel having a value of 1 represents a black dot, i.e., a drop or dot of ink applied. In color printing, each pel is more complexly represented. A particular color pel is considered the admixture of three basic or primary colors.

The most common additive primary colors are red, green, and blue. The hue and saturation of a given pel is represented as some combination of the primaries. Additive color systems are used in television picture tubes, for example. Additive primaries are those used when the image source emits the perceived illumination. The additive primaries are referred to herein as the RGB domain.

The most common subtractive primaries are cyan, magenta, and yellow. The color of a pel is represented as some combination of the primaries. Subtractive color systems are used in printed images using inks of the primary colors. Subtractive primaries are used when the perceived image is created by reflected illumination. The subtractive primaries are referred to herein as the CMY domain.

The pels of the source image 10 are scanned in the system of FIG. 1 by three light sensitive devices 15A, 15B, and 15C. Such devices can be photodiodes. Each device is fitted with a filter 17A-17C so that each device produces a signal corresponding to the luminosity of the color passed by the filter. The filters are considered to be red, green, and blue. The source image 10 is illuminated by a light source 19.

The output signals from the scanning devices 15A-15C are the RGB color component signals of the scanned pels. These signals are coupled to a video processor 103 which amplifies and suitably conditions the signals.

The scanning devices 15A-15C with filters 17A-17C and the video processor 103 can also be implemented with a commercially available color television camera.

The RGB color signals are converted to digital values by analog-to-digital converters 11A-11C. The number of bits in each color signal depends on the precision desired in the resulting signals that are used to control the color printer. As will be discussed below, eight bits can be used since integer values from 0 to 255 are sufficient to implement the invention, but sixteen bits can be used for greater precision using expanded integers.

A signal processor 105 corrects the RGB signals for nonlinearities of the scanning system and converts the RGB signals into the CMY domain. The hue and saturation values of the CMY signals are automatically adjusted to control a color printer 107 so that the reproduction of the original image is as accurate as possible.

Figure 2:
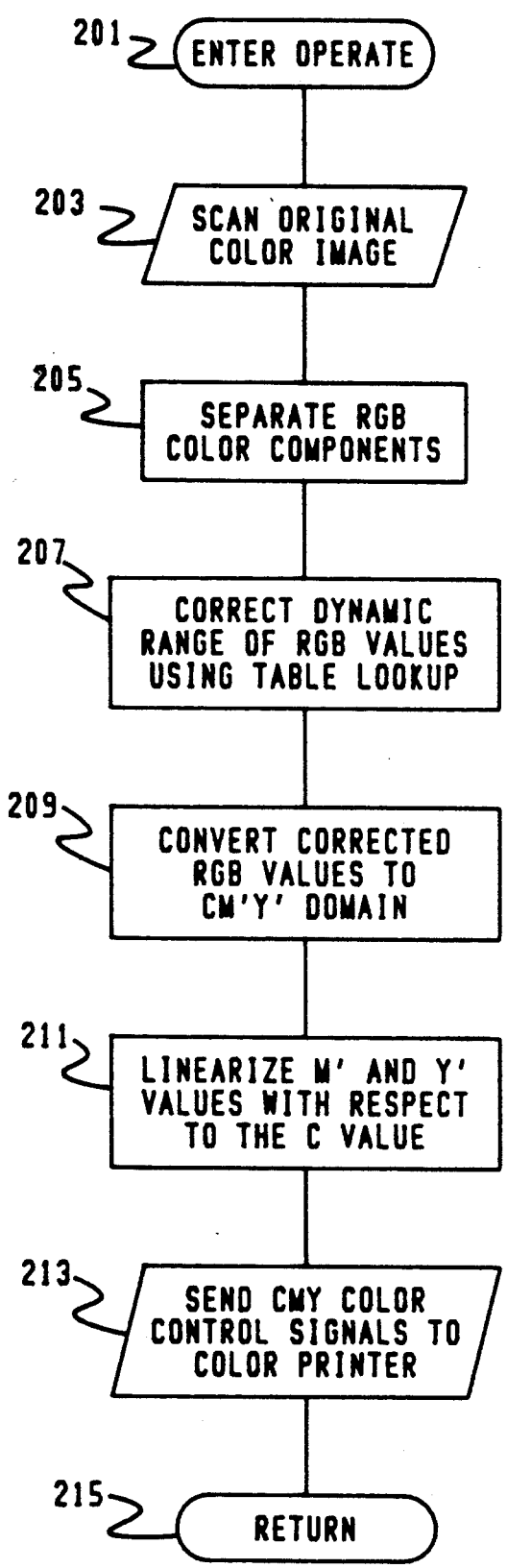
FIG. 2 is a flowchart of the method according to the invention.

The flowchart of FIG. 2 shows the steps performed in the process. At a terminal block 201, the subroutine for executing the process is entered. This is performed for each pel of the scanned original image.

The original is scanned by a process block 203 and the separation of the color components including digitization is performed in a process block 205. These operations supply the signals that are used by the process of the invention.

The RGB signals are corrected to the full dynamic range by a process block 207. In effect, this correction causes the gray scale to pass through the white point of the color space, the gray scale being a line in the color space that connects the white point with the black point. This dynamic range correction is nonlinear and corrects for the nonlinearities in the scanning system.

Next, in a process block 209, the RGB signals are converted to the $CM_1Y_1 1$ domain. This is performed by matrix multiplication where the matrix coefficients are determined empirically as explained below. The conversion is a linear process that changes the hue values but not the saturation.

A nonlinear correction is performed next in a process block 211 to correct for the low saturation introduced by the preceding process. It is a gray scale correction that shapes the gray scale line to pass through the correct black point as discussed above. This correction produces a continuous neutral tone that creates a reproduction that comports with the original.

The resulting CMY signals are then passed to the color printer by an input/output block 213 to cause the printer to reproduce the original. Alternatively, the CMY signals can be used to make color printing plates for individual printing inks using lithographic, offset, or other printing techniques.

The implementation of the above-described invention should be such that the conversions and corrections can be accomplished as fast as possible since an image is composed of a large number of pels, each of which requires the conversion process. Therefore, the following description is directed to an implementation using table lookup and expanded integer arithmetic.

Figure 4:
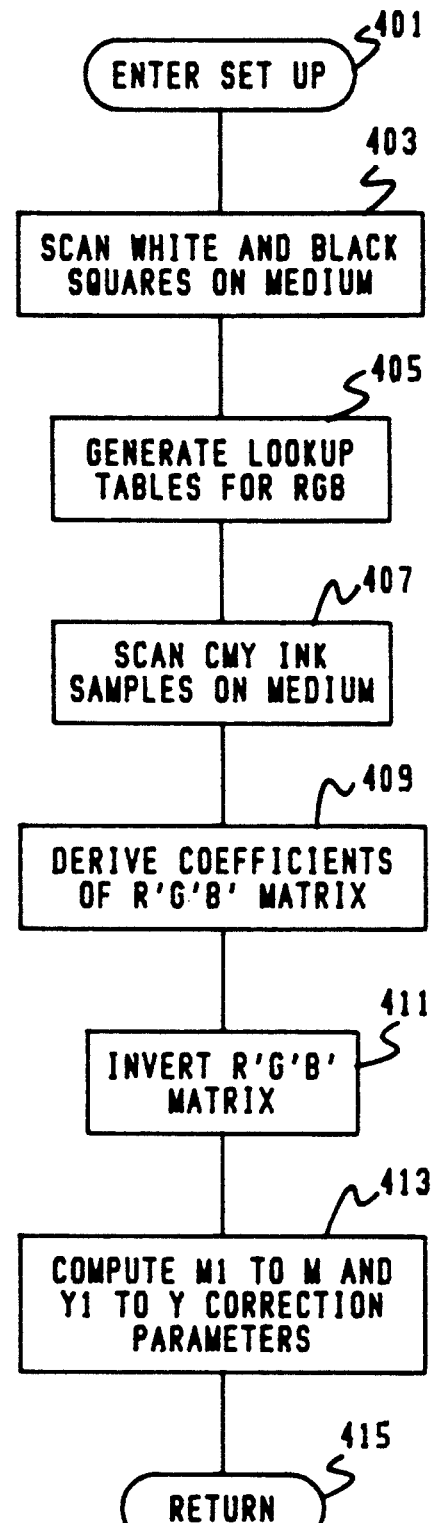
FIG. 4 is a flowchart of the process used in presetting values for the method of FIG. 2.

The set up process is shown in the flowchart of FIG. 4. It is shown as a subroutine which is performed for each combination of scanner, medium, and inks used in the reproduction process.

The set up subroutine is entered at a terminal block 401. In a process block 403, a test target of white and black squares is scanned to ascertain the dynamic range of the scanning system. The white square is the medium itself and the black square is printed on the medium using black ink. If a color television camera is used as the scanning system, the f-stop is preferably set to the minimum value that prevents saturation.

The color component intensity values of each square are treated as a normalized distribution. From these distributions, the mean values of each component is calculated. This is within the skill of the art and need not be explained in detail. The results of the test scan are six values, viz., Rwht, Gwht, Bwht, Rblk, Gblk, and Bblk. These values are, respectively, the mean value of the red distribution of the white square scan, the mean value of the green distribution of the white square scan, the mean value of the blue distribution of the white square scan, the mean value of the red distribution of the black square scan, the mean value of the green distribution of the black square scan, and the mean value of the blue distribution of the black square scan.

From the derived values, the process block 405 could create linear dynamic expansion tables for each color component. Each table is constructed by connecting the Xwht to Xblk points for each color component and computing the values of the intermediate points. (X is used to represent R,G, or B.) Each lookup table contains 256 values, each value being one or two bytes (eight or sixteen bits). Single byte values can be used, in which case the table entries vary from 0 to 255. If two bytes entries are used, the entries can vary from 0 to 25500 (255.00) representing expanded integer arithmetic, the two decimal places being implied. This results in greater precision which is not always necessary for satisfactory reproduction. For this reason and for purposes of clearer disclosure, the table descriptions will be made in terms of single byte entries.

The input values to the tables, x, are address offsets to the memory address of the first value. Each table has a maximum size of 256 entries—the y values—but can have fewer entries, as will be explained below, to reduce memory requirements.

The table lookup technique provides a simple, fast method of dynamically expanding the color component scan values to a full range values of 0 to 255. Other range minimum and maximum values can be used. The y (output values) values are calculated from the x (input values) as follows:

$$y = 0 \quad \text{for } x \leq Xblk \quad (1)$$
$$y = 255(x - Xblk)/(Xwht - Xblk) \quad \text{for } Xblk < x < Xwht \quad (2)$$
$$y = 255 \quad \text{for } x \geq Xwht \quad (3)$$

A linear dynamic range correction produces a reproduction that is too dark. The output range will include the same nonlinearities as the scanning system. The limitations of the system must be considered in reproducing an image with the colors the same as the original. Acceptable print quality requires color balance as well as reducing saturation. This is accomplished by using a nonlinear correction value that is different for each color component transfer function.

A gamma factor, γ, is a measure of the contrast of an image, e.g., a photograph or television picture. Each system has an associated gamma factor. The following equation shows the relation of input and output values with respect to the gamma factor:

$$x = y^{1/\gamma} \quad (4)$$

This nonlinearity correction is made with a gamma function derived empirically for each color component and can be combined with the dynamic range correction. Equation (2) above becomes $$y = 255(x - Xblk)/(Xwht - Xblk)^{1/X\gamma} \text{ for } Xblk < x < Xwht \quad (5)$$

An example of the construction of the lookup tables will now be described using the following exemplary values that are found empirically from a particular system:

| | | |
|---|---|---|
| Rblk = 67 | Rwht = 233 | Rγ = 1.8 |
| Gblk = 49 | Gwht = 234 | Gγ = 1.5 |
| Bblk = 57 | Bwht = 176 | Bγ = 1.4 |

Figure 3:
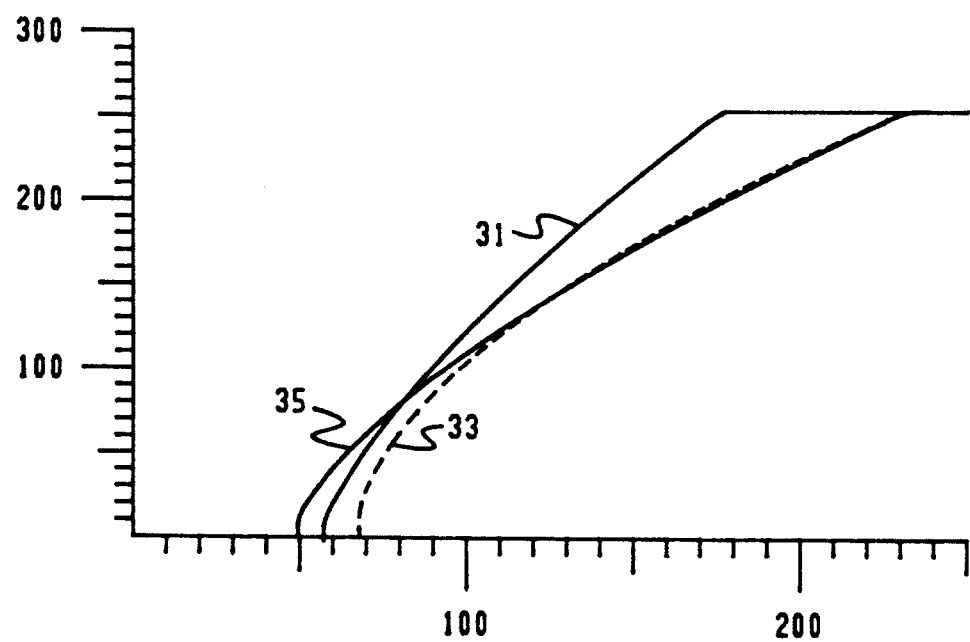
FIG. 3 is an illustrative example of a graph of the values used for correcting the dynamic range of scanned color component signals.

Substituting the exemplary values into equations (1), (5), and (3) produces the curves shown in FIG. 3. The dashed line 33 is the curve for the red component. Lines 35 and 31 are the curves for the green and blue components, respectively. The actual output values, however, are integer values that are stored in the tables. For the red component, the first nonzero y value occurs at an x value of 68 (hexadecimal 44) and is 14.90 using expanded integer arithmetic. This would translate to 05D2 in hexadecimal numbers. That is, 1490 (the two decimal places being implied) decimal number converts to the sixteen bit binary number 0000010111010010 which is stored at an address offset from the table origin by 44 hexadecimal. (The hexadecimal number system is well known in the digital art.)

The second nonzero value of the red component table is at offset 45 hexadecimal and has a value of 21.90 or 088E in expanded hexadecimal numbers.

At x=232 decimal (E8 hexadecimal), the y value is 254.15 decimal (6347 hexadecimal expanded integer). At x=233 (E9), the value of y is 255 (639C) which is the maximum. The curves of FIG. 3 are plotted to decimal scales.

Since the curve values increase monotonically, it is not necessary to store all the minimum (0) and maximum (255) values. Storing the other values results in smaller tables and a savings of memory space.

The table lookup transformations, in summary, convert the color component signals to their equivalents of the full dynamic range with corrections for the nonlinearity of the scanning system.

The next step in the set up process shown in the flowchart of FIG. 4 is to scan the target inks using test areas printed on the medium. In this description, the inks are cyan, magenta, and yellow (CMY) as illustrated in a process block 407.

In a process block 409, the results of scanning the color inks are coefficients of a conversion matrix that translate from the additive RGB domain to the subtractive CMY domain. The translation of additive red components, R, to subtractive red components, R', is accomplished by R' = 1 − R. If Z is used to represent cyan (C), magenta (M), or yellow (Y), in turn, then the coefficients are found by $$X' = Z \times (256 - X)/256 \quad (6)$$

Substituting each successive RGB value from scanning each of the CMY ink samples gives nine coefficients. From the following exemplary values, an example of the matrix coefficients will be derived.

| Ink scanned      | cyan | magenta | yellow |
|------------------|------|---------|--------|
| Red components   | 27   | 200     | 0      |
| Green components | 134  | 28      | 235    |
| Blue components  | 203  | 90      | 46     |

Using the results in equation (6) produces the matrix coefficients. For example, the coefficient in the first column of the first row is $$R' = (256 - 27)/256 = 0.90$$

The matrix is, therefore, $$\begin{pmatrix} R' \\ G' \\ B' \end{pmatrix} = \begin{pmatrix} 0.90 & 0.22 & 0.00 \\ 0.48 & 0.89 & 0.08 \\ 0.21 & 0.65 & 0.82 \end{pmatrix} \times \begin{pmatrix} C \\ M \\ Y \end{pmatrix} \quad (7)$$

This gives the subtractive RGB values in terms of the CMY domain values. To give the values of the CMY domain in terms of the RGB subtractive domain, the matrix is inverted in a process block 411.

Therefore, $$\begin{pmatrix} C \\ M_1 \\ Y_1 \end{pmatrix} = \begin{pmatrix} 1.286 & -0.342 & 0.033 \\ -0.715 & 1.400 & -0.137 \\ 0.237 & -1.022 & 1.139 \end{pmatrix} \times \begin{pmatrix} R' \\ G' \\ B' \end{pmatrix} \quad (8)$$

The calculations in the set up process can be floating point to any desired accuracy since they are performed only once for each scanner and medium.

The $M_1$ and $Y_1$ variables are intermediate values for the M and Y signals and are corrected in a process block 413. The CMY values resulting from equation (8) would not accurately reproduce the continuous neutral tone of the original colors because the gray scale of $M_1$ and $Y_1$ does not pass through the correct black point relative to the cyan values.

A nonlinear correction that has been found to compensate for this error is $$M = M_1(1 + C/k_1) \quad (9)$$

and $$Y = Y_1(1 + C/k_2) \quad (10)$$

The dynamic range correction passed the gray scale through the white point. Since the black points are at the values $R' = G' = B' = 255$, these values can be substituted into equation (8) so that $$\begin{pmatrix} C \\ M_1 \\ Y_1 \end{pmatrix} = \begin{pmatrix} 1.286 & -0.342 & 0.033 \\ -0.715 & 1.400 & -0.137 \\ 0.237 & -1.022 & 1.139 \end{pmatrix} \times \begin{pmatrix} 255 \\ 255 \\ 255 \end{pmatrix} \quad (11)$$

which gives $C = 249.135$, $M_1 = 139.903$, and $Y_1 = 136.274$.

The values of $k_1$ and $k_2$ are found by substituting C for M and Y in equations (9) and (10), respectively. This gives $$M = M_1(1 - C/319) \quad (12)$$

and $$Y = Y_1(1 + C/301) \quad (13)$$

This completes the set up process of FIG. 4 and supplies the values needed in the operate subroutine.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. A method to process color component signals for printing accurate color image reproductions comprising steps of:

scanning a color image to be reproduced to derive said color component signals from the color image;

adjusting the color component signals to correct errors in the signals introduced by the scanning step including extending a dynamic range of each color component signal to pass through its white and black points;

converting said adjusted color component signals to intermediate color printing signals to regulate hue values;

correcting the intermediate color printing signals for non-linearities in reproduction characteristics of inks used to print the reproduction;

transforming corrected intermediate color printing signals to compensate color printing signals by steps of deriving a factor for each of said color printing signals depending on its black paint, and multiplying one of the intermediate color printing signal by a nonlinear factor proportional to its derived factor to obtain a first compensated color printing signals value and each of the other two intermediate color printing signals by a nonlinear multiplier proportional to its derived factor and the first compensated color printing signal value to obtain the other two compensated color printing signals; and printing a color reproduction of the color image to be reproduced according to the values of the compensated color printing signals.

2. The method claimed in claim 1 wherein said color component signals represent the values of red, green, and blue hues in the color image to be reproduced.

3. The method claimed in claim 1 wherein the adjusting step includes corrections to errors in dynamic ranges and gamma functions of the color component signals from the scanning step.

4. The method claimed in claim 1 wherein said correcting step includes the steps of:

acquiring ink component values by scanning samples of inks to be used in the printing step; and obtaining coefficients representing color conversion factors by multiplying an inverse of ink component values from the acquiring a matrix of values step times a complement of said adjusted color component signals.

5. The method claimed in claim 1 wherein the color printing signals represent cyan, magenta, and yellow color ink values.

6. The method claimed in claim 1 wherein said multiplier has the form $1 + X/k$ where X is the compensated color printing signal of a preceding color printing signal and k is the derived factor, the value of X taken as zero for a first color printing signal.

* * * * *